United States Patent [19]
Rechmeier et al.

[11] 4,110,121
[45] Aug. 29, 1978

[54] PROCESS FOR PRODUCING CEMENT CLINKER

[75] Inventors: Helmuth Rechmeier, Balingen; Gerhard Rohrbach, Dotternhausen, both of Fed. Rep. of Germany

[73] Assignee: Portlandzementwerk Dotternhausen Rudolf Rohbach Kommanditgesellschaft, Balingen, Fed. Rep. of Germany

[21] Appl. No.: 804,816

[22] Filed: Jun. 8, 1977

[30] Foreign Application Priority Data

Jun. 16, 1976 [DE] Fed. Rep. of Germany ....... 2627056

[51] Int. Cl.$^2$ ................................................ C04B 7/02
[52] U.S. Cl. .................................................. 106/100
[58] Field of Search ................................ 106/100, 103

[56] References Cited

U.S. PATENT DOCUMENTS

| | | | |
|---|---|---|---|
| 4,001,031 | 1/1977 | McCord et al. | 106/103 |
| 4,022,630 | 5/1977 | Watson et al. | 106/103 |

*Primary Examiner*—James Poer
*Attorney, Agent, or Firm*—Haseltine, Lake & Waters

[57] ABSTRACT

To product cement clinker, particulate material such as limestone, clay, iron oxide and sand is fed to a heat exchanger in which it is heated by heat supplied from a furnace. The heated material is conveyed to the furnace and sintered therein to form the cement clinker. Fuel formed from organic waste, for example motor vehicle tires, is used as the fuel.

18 Claims, 2 Drawing Figures

PROCESS FOR PRODUCING CEMENT CLINKER

BACKGROUND OF THE INVENTION

This invention relates to a process for producing cement clinker wherein raw particulate matter or meal is fed to a heat exchanger, heat is supplied to the heat exchanger from a downstream furnace, the raw particulate matter is heated in the heat exchanger, and the heated raw particulate matter is conveyed to the furnace and is sintered therein by use of a fuel to form cement clinker.

It is known that cement clinker can be produced from raw particulate material in rotary cylindrical kilns and fluidized bed furnaces. After sintering or calcining, the cement clinker is cooled. The cooled cement clinker is then finely ground for use in the production of cement, setting control agents or other agents being added during the grinding process. The raw particulate matter is, for example, limestone, clay, iron oxide and sand.

To produce the high flame temperatures (above 2000° C.) required for calcining or sintering the cement clinker, pulverized coal, oil or gas are used as high grade fuels. It is also known to use electrical energy for this purpose (see "Schweizerische Bauzeitung" 66, 1948, p. 465). These high grade forms of energy are expensive.

It is further known to use lower-grade fuels instead of the expensive forms of energy given above. Examples of such low-grade fuels are oil shale, wash mine waste and bituminous limestone (see German Pat. No. 1,251,688). However, the lower grade fuels can only be used to a limited extent for the calcination process, namely in the low temperature range. For an endothermic process at low temperature, a high amount of heat is needed, and the ash constituents remain in the clinker mixture.

For the high temperature range in which the sintering and formation of the clinker minerals is effected, only the aforementioned expensive high grade fuels have hitherto been used, since the flame temperatures which can be obtained depend on the calorific value of the fuel and on the excess of air.

The object of the invention is to create a process of the type specified above wherein economical fuels can be used, particularly for the high temperature range, for sintering the cement clinker.

SUMMARY OF THE INVENTION

To solve this task the invention proposes that waste fuel formed from organic waste, such as motor vehicle tires, should be used as fuel in the process specified above.

Apart from motor vehicle tires, the organic waste matter used to form the fuel may also be rubber scrap, plastics scrap or the like. Such organic waste materials are high grade, i.e. they have a high calorific value. They are, moreover, reasonably priced and available in sufficient quantities.

It has been found that waste fuels formed from organic waste matter can not only be burned in the furnace but also, or alternatively, in the heat exchanger.

Attempts have already been made to dispose of used motor vehicle tires, rubber scrap, plastic waste or the like, which constitutes waste products accumulating in large quantities. Motor vehicle tires for example have been disposed of by burning. Serious environmental problems arose however, in that during the burning process large quantities of sulfur dioxide arose from the sulfur used in the tires for vulcanization. This sulfur dioxide could only be removed from the gases at great expense. Also, during the burning process a considerable dust nuisance arose from the zinc oxide present in the tires. No burning works of substantial extent have therefore been erected.

Furthermore, tires and rubber waste matter has been deposited on rubbish dumps. Difficulties arose here, however, because tires are very unwieldy and take up considerable space on the dump. More serious, however, is the fact that on dumping the tires, compression of the rubbish dump becomes virtually impossible. Rats or the like may live in spaces thus remaining so that considerable health risks result from such a dump. Attempts have also been made to convert the tires into usable products by very extensive comminution. This was actually successful at great expense. It was provided, however, that the market could not by any means absorb the quantity of such products resulting from the processing of the total waste matter.

In the process of the invention, wherein the combustion energy of the fuel formed from the organic waste matter is used for the production of cement clinker, all these disadvantages are avoided and the environmentally-harmful components contained in waste fuels are retained in the resultant cement clinker.

DESCRIPTION OF THE PREFERRED EMBODIMENTS

Figure 1:
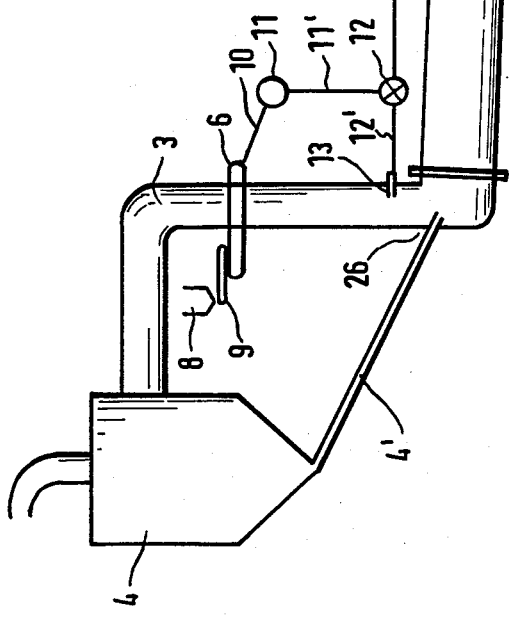

The waste fuel can be comminuted by suitable processing and can be burned like coal dust in a coal dust furnace by direct injection into the furnace. In this instance, however, the comminution of the organic waste, e.g. the motor vehicle tires, to a grain size which allows a fast, efficient combustion, still proves relatively expensive.

In order to use the waste fuels more economically, attempts must therefore be made to use them in as coarse a form as possible. This is possible since the waste fuels are pyrolyzed or retorted at low temperature and the resultant pyrolyzed residue is comminuted or gasified. In experiments in accordance with this suggestion, it has been found that if such waste fuels are initially freed by pyrolysis of their volatile constituents, the remainder of the fuel, mainly carbon and ash constituents, is extraordinarily easy to pulverize. The pyrolyzed residue in such cases behaves somewhat like an agglomerated soot which can be very finely pulverized by light rubbing movements.

Pyrolysis as the first step and comminution or gasification as the second step need not be effected in spatially separate manner. It is possible for the two steps to be effected in one apparatus in immediate succession. The pyrolysis and comminution or gasification can also be effected simultaneously.

To carry this process into effect the following method has proved advantageous. The previously coarsely comminuted waste fuels are introduced into the exhaust gas duct from the furnace, e.g. a rotary cylindrical kiln, to the heat exchanger system, by way of a conveying device constructed in any desired manner, although this device must be constructed such that no particles of fuel fall into the exhaust gas duct. Due to the radiation and convection heat of the hot furnace exhaust gases, the pyrolyzable constituents are pyrolyzed from the waste fuels and are burned by the oxygen excess in the furnace exhaust gases, which excess must be kept sufficiently high. In so doing they transfer their combustion energy to the raw meal distributed in the rising gas stream, whereby the raw meal can be largely re-acidified. The residue pyrolyzed in the heat exchanger or in the exhaust gas duct from the furnace to the heat exchanger is carried out of the combustion shaft by the same conveying device and is subsequently comminuted, by means of any desired device, with a low energy expenditure. The largely comminuted fuel can be injected into the exhaust gas duct or the heat exchanger again, where it is combusted with the excess of air still remaining, or it can be conveyed to the main nozzle of the rotary cylindrical kiln, where it, together with any other high-grade fuel, burns in the sintering zone of the rotary cylindrical kiln.

A further advantageous utilization of the pyrolyzed residue may be achieved in that the pyrolyzed residue is ground, together with raw particulate matter, and the mixture of raw meal and carbonization residue powder subsequently injected into the heat exchanger wherein the pyrolyzed residue powder of the mixture is burned. During grinding of the pyrolyzed residue with the raw meal, the pyrolyzed residue cools immediately to ambient temperature. The raw meal thus enriched with fuel can be introduced as fuel into the duct from the rotary cylindrical kiln to the cyclone heat exchanger as described in German Pat. No. 1,251,688, the added ground fuel burning efficiently and transferring its energy to the raw meal to be de-acidified.

This procedure has the considerable advantages that no cooling device is required for the pyrolyzed matter since the pyrolyzed residue in contact with the raw meal immediately transfers its heat, and further that no separate grinding assembly is needed for the pyrolyzed residue.

In addition pyrolysis of the waste fuel in the heat exchanger as described above, pyrolysis of the waste fuel is also possible in the discharge or outlet end of the rotary cylindrical kiln. In this case the radiation heat of the sintering zone is used as heat source for the pyrolysis process. The pyrolyzed products are immediately burned at this point by the hot air coming from the clinker cooler. The pyrolyzed residues can be further processed as described above if they are not burned at this point by the hot cooler-air.

In the applications described above, the amount of fuel to be used is limited by the fact that the thermal energy required for the pyrolysis process penetrates relatively slowly into the coarse particles of fuel. A substantially larger amount of fuel can be utilized if a gasification of the waste fuel is effected externally of the furnace. In this case, it must be taken into consideration that gasification processes are effected on coarse fuel, which requires the use of a relatively long residence time in the treatment chamber. This is because coarse material has a relatively small surface area and the gasification process is dependent on the transfer of heat to the fuel particle and on the speed of introduction of the heat into the particle (the characterizing factors are the heat transfer coefficient $q$ and the thermal conductivity coefficient $a$). Apart from the surface area of the particles, the gasification process is also dependent on the speed of corrosion of the gasifying medium ($O_2, H_2O, CO_2$). In this case, the partial pressure of the medium and the temperature are the determining factors.

It is therefore necessary, if it is desired to obtain the highest possible conversion per unit volume, to choose a reaction apparatus which permits the highest possible residence time of the waste fuel. As the conversion reaction, there should be chosen one which operates with the highest possible partial pressures of the gasification media.

As the reaction apparatus, it is preferred to use shaft gasifiers (pyrolysis shaft) or fluidized bed gasifiers (vortex or fluidized bed furnaces) of known construction, since considerable conversions per volume unit can be obtained, particularly where pressure gasification is used.

The type of gasification preferred is that powered by a water gas reaction, since it permits operation with both an oxygen partial pressure and a water partial pressure. Moreover, the water gas reaction allows the temperature of the gasification process to be controlled. This is particularly important because both in the shaft gasifier and in the fluidized bed gasifier, because of the melting points of the gasification residues, certain temperatures must not be exceeded since otherwise those residues will bake on the walls of the apparatus.

Accordingly, in one embodiment of the invention, the previously coarsely-comminuted waste fuel is first pyrolyzed, the pyrolyzed residue is introduced into a fluidized-bed furnace wherein a fluidized bed consisting of coarse turbulent bodies, e.g. ceramic bodies, is used to effect comminution of the pyrolyzed residue, and the comminuted pyrolyzed residue is subsequently gasified, e.g. by producer gas or water gas. In this instance, there can be used a fluidized-bed furnace subdivided into two sections in one of which the waste fuel is pyrolyzed and in the other of which the pyrolyzed residue is gasified. The gas resulting from the gasification can be burnt in the kiln and/or in the heat exchanger.

In the case of tires with a textile reinforcement, the reinforcement gasifies completely, whilst in the case of tires with a steel reinforcement, the steel wires oxidize, but because of their high specific weight are not carried out with the gases. They may be removed from time to time through a bottom outlet or a discharge gate with a part of the ceramic particles forming the fluidized bed, and be separated from these particles by sieving, after which the ceramic particles are returned to the fluidized bed.

The sulfur escaping on pyrolysis and gasification of the waste fuel is combusted in the rotary cylindrical kiln to form sulfur dioxide ($SO_2$). During de-acidification of the calcium carbonate, this sulfur dioxide combines with the resulting CaO and with atmospheric oxygen to form $CaSO_4$ (anhydrite), which remains quantitatively in the clinker and which, like added natural gypsum, contributes to the control of the setting time of the cement. All the other inorganic constituents of the waste fuel are discharged with the gases of the pyrolysis or gasification device and on sintering remain in the clinker. They do not interfere with the setting behavior of the cement. The method is thus useful for converting environmentally-harmful sulfur dioxide and also the inorganic constituents of the waste fuel which otherwise cannot be removed from the exhaust gases to an environmentally-beneficial form.

Figure 2:
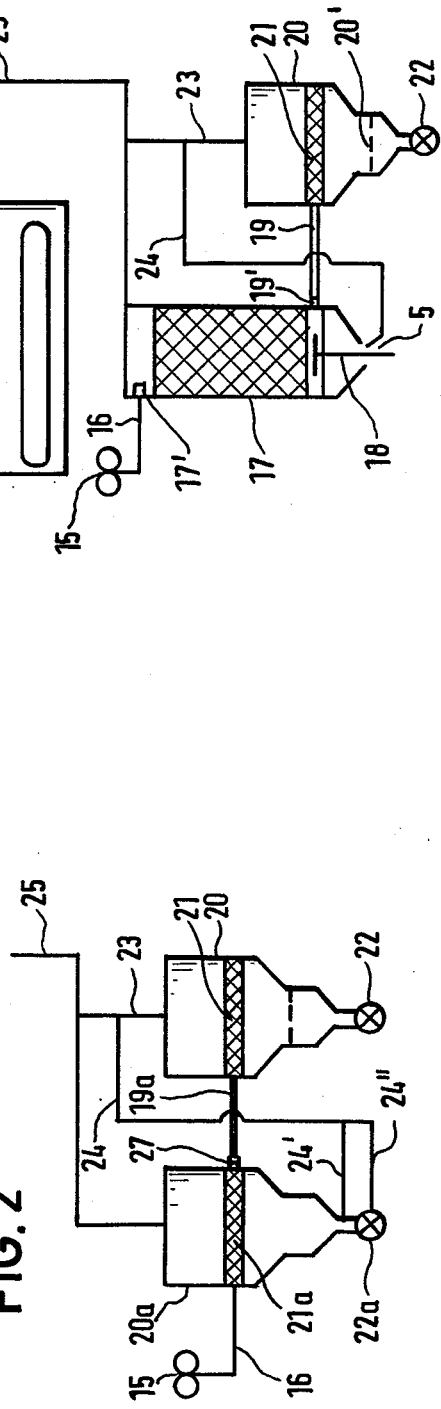

The drawings illustrate schematically by way of example embodiments of the invention. In the drawings:

FIG. 1 shows a device for carrying into effect a process in accordance with the invention; and FIG. 2 shows a part of the device according to FIG. 1 in modified form.

The device shown in FIG. 1 comprises a furnace in the form of a rotary cylindrical kiln 1, at the discharge end of which there is disposed a cooler 2. To a main burner 7 of the rotary cylindrical kiln 1 there is connected a blower 14. To the inlet end of the rotary cylindrical kiln 1 there is connected an exhaust gas duct 3 leading to a heat exchanger 4 of a cyclone heat-exchanger system. From the heat exchanger 4 an inlet line 4' for pre-heated raw meal leads into the inlet end of the rotary cylindrical kiln 1 at 26.

The illustrated device further comprises a bin 8 for waste fuel. At the discharge end of the bin 8 there is arranged a continuous metering device 9 to which a conveying device 6, for example a suitably constructed conveyor belt, passing through the exhaust gas duct 3, is connected. From the conveying device 6, a connecting conveying device 10 leads to a comminuting device 11, from which a duct 11' leads to a blower 12. The blower 12 is connected via a duct 12' to a burner 13 arranged in the exhaust gas duct 3.

The illustrated device moreover comprises a pyrolysis shaft 17 with inlet valve 17' arranged at its upper region. At the inlet valve 17, there is arranged a conveying device 16 leading from a comminuting devie 15. From the upper end of the pyrolysis shaft 17 a gas supply line 25 for the pyrolyzed gases leads to the blower 14 connected to the main burner 7, which blower is connected via a by-pass line 25' to the blower 12 of the burner 13 arranged in the exhaust gas duct 3. At its lower end, the pyrolysis shaft 17 is connected via a pyrolyzed residue duct 19 to a fluidized bed 21 of a gasification-fluidized bed furnace 20. The pyrolyzed residue duct 19 is provided with a gas inlet lock 19'. Below the fluidized bed 21, a grate 20' is located in the gasification-fluidized bed furnace 20. From the upper end of the gasification-fluidized bed furnace 20, a gas outlet duct 23 leads to the gas supply line 25. Upstream of the inlet into the gas supply line 25, a gas duct 24 branches off from the gas outlet duct 23. This duct 24 leads to an inlet 5 at the lower end of the pyrolysis shaft 17. The pyrolysis shaft 17 further has at the lower end a discharge device 18 for the pyrolyzed residue.

In the embodiment according to FIG. 2, instead of the pyrolysis shaft 17, there is provided a second fluidized-bed furnace 20a having a fluidized bed 21a. The fluidized-bed furnaces 20 and 20a are interconnected by a pyrolyzed residue duct 19a. The gas duct 24 branching off from the gas outlet duct 23 separates into the two branches 24' and 24" the first of which is connected directly to the lower end of the fluidized-bed furnace 20a and the second of which is connected to a blower 22a positioned at the lower end of the fluidized-bed furnace 20a. The arrangement of the comminuting device 15, the conveying device 16 and the gas supply line 25 in FIG. 2 is the same as in FIG. 1.

The use of the devices shown in FIGS. 1 and 2 will now be described.

In the comminuting device 15, organic waste, for example motor vehicle tires, are comminuted into pieces with lengths and breadths of several centimeters. In the device of FIG. 1, these pieces pass by means of the conveying device 16 via the inlet valve 17' into the pyrolysis shaft 17. The pyrolyzed residue resulting from the pyrolysis is discharged by means of the discharge device 18 and passes via the pyrolysis residue duct 19 into the fluidized-bed furnace 20. In the fluidized-bed furnace 20, the fluidized bed 21 is formed by relatively coarse ceramic particles. The fluidized bed 21 itself is fluidized by air from the blower 22.

The pyrolyzed residue is swiftly comminuted solely by the eddy motion of the fluidized bed 21 and is gasified to form a producer gas or water gas by the action of the injected air (to which water may be added in some circumstances). This gas, or a part of it, may be fed into the pyrolysis shaft 17 through the inlet 5, where it effects the pyrolysis of the relatively coarse-particled waste fuel. As will later be described in more detail, the pyrolysis gases themselves, as well as the gase emanating from the gasification of the pyrolyzed residue, escape through the gas supply line 25 and are conveyed to the rotary cylindrical kiln 1 where, whilst hot combustion air is supplied from the clinker cooler 2, they burn and yield the thermal energy for clinker calcination.

In the device shown in FIG. 2, instead of the pyrolysis shaft 17, a second fluidized bed 21a is used in which pyrolysis of the fuel is effected in the same way as in the pyrolysis shaft, except that the material being pyrolyzed is fluidized. After pyrolyzing of the fuel the pyrolyzed residue is removed via an overflow valve 27 from the fluidized-bed furnace 20a and supplied to the fluidized bed furnace 20 where comminution and gasification of the fuel proceeds in the same manner as already described with reference to FIG. 1. The second fluidized bed can be disposed above the first fluidized bed 21. Also, the first and second fluidized beds can be arranged together in a single fluidized-bed furnace.

If the rotary cylindrical kiln 1 is to produce an output of 2000 t of cement clinker per day, this corresponds to an hourly output of 83.3 t. The heat requirement of the rotary cylindrical kiln 1 should be 800 kcal/kg clinker. For this purpose, 6664 kg of fuel oil with a thermal coefficient of 10,000 kcal/kg are required per hour.

In an example of the application of the process according to the invention, 1000 kg per hour of comminuted organic waste are introduced via the bin 8, the continuous metering device 9 and the conveying device 6 into the exhaust gas duct 3. Approximately 500 kg per hour of the fuel introduced gasify in the exhaust gas duct. The resultant gases burn as a result of an excess of air maintained in the rotary cylindrical kiln 1 and transmit their thermal energy to the raw meal entering at 26 from the heat exchanger 4. The pyrolyzable constituents have a calorific value of 9000 kcal/kg, and are thus equivalent to 450 kg of heavy fuel oil. The heat consumption of the main burner 7 is directly reduced by this amount of heat. The remaining pyrolyzed residue has, after removal of the ash constituents, a calorific value of about 8000 kcal/kg. After the aforementioned removal of the ash constituents (about 7% calculated on the total waste fuel), after discharge of the pyrolyzed residue and after this residue has been supplied via the conveying device 10 to the comminuting device 11, and after injection of the comminuted fuel via the blower 12 through the burner 13 into the exhaust gas duct 3, a quantity of fuel corresponding to 344 kg of heavy oil is again introduced at this point. Thus in all for the use of 1000 kg/h of waste fuel, 794 kg of heavy fuel oil/h are saved. This is the equivalent of a daily saving of 19,056 t of heavy fuel oil.

In another process according to the invention, approximately 8000 kg of tires are comminuted in the comminuting device 15 per hour. These comminuted tires pass into the pyrolysis shaft 17 via the conveying device 16.

Through the gas inlet 5, all or part of the hot gases from the gasification-fluidized bed 21 are introduced via ducts 23 and 24 into the pyrolysis shaft 17, and cause pyrolysis of the pyrolyzable constituents of the comminuted tires. In this instance about 4 t per hour of pyrolysis gas with a calorific value of about 9000 kcal/kg pass through the gas supply line 25 and the blower 14 into the main burner 7 of the rotary cylindrical kiln 1. As a result, fuel with a calorific value equivalent to 3.6 t of heavy fuel oil is supplied to the rotary cylindrical kiln 1 every hour.

The pyrolyzed residue discharged from the pyrolysis shaft 17 via the discharge device 18 passes through the duct 19 into the fluidized bed 21 of the fluidized-bed furnace 20, to which air (preferably preheated air from the clinker cooler 2) is supplied by the blower 22. In this instance, the pyrolysis residue (mainly carbon) is comminuted in the fluidized bed and gasified. To the rotary cylindrical kiln 1, there is again supplied, as a result of the gasification of 3440 kg carbon/h, heat having a calorific value equivalent to 2.752 t of heavy fuel oil. Including the fuel from the pyrolysis gases (equivalent to 3600 kg), there is thus supplied to the furnace from the waste fuels heat having a calorific value equivalent to 6352 kg of heavy fuel oil. A small quantity of heavy ful oil can simultaneously be fired in the main burner 7 to balance any fluctuations in the calorific value of the waste fuel.

We claim:

1. In a process for producing cement clinker wherein raw meal is fed to a heat exchanger, heat is supplied to the heat exchanger from a downstream kiln, the raw meal is heated in the heat exchanger and the heated raw meal is conveyed to the kiln and sintered therein by use of a fuel to form the cement clinker, the improvement which comprises using high grade waste fuel formed from organic waste in the form of motor vehicle tires, rubber scrap, or plastics scrap and wherein the waste fuel is processed before combustion by pyrolysis to form pyrolysis gases and a pyrolyzed residue and said pyrolyzed residue is comminuted or gasified.

2. Process according to claim 1, wherein the organic waste consists of motor vehicle tires.

3. Process according to claim 1, wherein the waste fuel is combusted in the kiln.

4. Process according to claim 1, wherein the waste fuel is combusted in the heat exchanger.

5. Process according to claim 1, wherein the pyrolysis is effected in the heat exchanger.

6. Process according to claim 1, wherein a rotary cylindrical kiln is used as the kiln and wherein the pyrolysis is effected in the discharge end of the rotary cylindrical kiln.

7. Process according to claim 1, wherein the pyrolysis is effected in a pyrolysis shaft.

8. Process according to claim 1, wherein the pyrolysis is effected in a fluidized bed.

9. Process according to claim 5, wherein after removal from the heat exchanger, the pyrolyzed residue is comminuted and the comminuted pyrolyzed residue is injected into the heat exchanger and burned therein.

10. Process according to claim 1, wherein, after removal from the heat exchanger, the pyrolyzed residue is comminuted and the comminuted pyrolyzed residue is supplied to a main burner of the kiln and is burned in a sintering zone of the kiln.

11. Process according to claim 1, wherein the pyrolyzed residue is ground together with the raw meal, and wherein the resultant mixture of raw meal and pyrolyzed residue powder is subsequently injected into the heat exchanger wherein the pyrolyzed residue powder of said mixture is burned.

12. Process according to claim 1, wherein the pyrolyzed residue is introduced into a fluidized-bed furnace in which a fluidized bed of coarse turbulence particles is used to effect comminution of the pyrolyzed residue, and wherein the comminuted pyrolyzed residue is subsequently gasified.

13. Process according to claim 12, wherein the coarse particles are ceramic particles.

14. Process according to claim 12, wherein the comminuted pyrolyzed residue is gasified by a producer gas reaction.

15. Process according to claim 12, wherein the comminuted pyrolyzed residue is gasified by a water gas reaction.

16. Process according to claim 7, wherein the gas resulting from pyrolysis and gasification is burned in the kiln.

17. Process according to claim 7, wherein the gas resulting from pyrolysis and gasification is burned in the heat exchanger.

18. Process according to claim 12, wherein there is used a fluidized bed furnace sub-divided into two sections in one of which the waste fuel is pyrolyzed and in the other of which the pyrolyzed residue is gasified.

* * * * *